Patented Jan. 26, 1926.

1,571,042

UNITED STATES PATENT OFFICE.

PERCY A. BOECK, OF LOS ANGELES, CALIFORNIA, ASSIGNOR, BY MESNE ASSIGNMENTS, TO THE CELITE COMPANY, A CORPORATION OF DELAWARE.

PROCESS OF TREATING FILTRATION RESIDUES FOR REUSE.

No Drawing. Application filed January 19, 1921. Serial No. 438,520.

*To all whom it may concern:*

Be it known that I, PERCY A. BOECK, a citizen of the United States, residing at Los Angeles, in the county of Los Angeles and State of California, have invented a new and useful Process of Treating Filtration Residues for Reuse, of which the following is a specification.

This invention relates to recovery, for reuse, of the filtering agent present in the residue produced in filtration in industrial operations, such for example as, sugar manufacture and refining or in filtration of other liquids containing suspended impurities. In the manufacture and refining of sugar, fruit juices, or other solutions of organic materials it is usual to employ a filtering agent, such as diatomaceous earth, to increase the efficiency and rapidity of the filtering operation. The filtering agent so used is mixed with the solution to be filtered and is retained in the filter cake, sludge or residue from the filter press or filter apparatus, together with the other solid material, including solid impurities, namely organic material in the form of colloidal or slimy material, from the sugar solutions or other solution being filtered, and also any lime or other inorganic reagent that may be present. The main object of the present invention is to produce from this residue a product that can be re-used in filtration for decolorization, or for other purposes.

This process consists essentially in subjecting the filtration residue to the action of heat either to change the character or consistency of the adsorbed organic material such as colloids and gums, so that they do not interfere with or prevent operation of the product for filtering or other purposes; or to remove to a greater or less extent organic material from the filtration residue, so as to leave the diatomaceous earth, or inorganic filtering agent, together with any other inorganic material that may be present, in condition for further use in filtration or for other purposes.

The process may be carried out in various ways according to the character of the material being treated and the product desired.

According to one mode of carrying out the invention, the filtration residue is dried (by air drying, or by the action of heat) and is then subjected to heat in any suitable furnace, kiln, or retort, in the presence of air or of an oxidizing atmosphere, to calcine and burn out the organic material contained therein to a sufficient extent to more or less completely restore its filtering property. In general, a certain amount of residual carbon may be present in the material so calcined, without preventing its successful use as a filtering agent. The heating or calcination is preferably carried out at such temperature and during such a period of time that the physical properties of the filtering agent are not destroyed. Thus, in the case of diatomaceous earth, the temperature and duration of heating should be only sufficient to drive off all the water or moisture existing in the diatomaceous earth in absorbed, adsorbed or uncombined state, as distinguished from chemically combined water. By calcining at such relatively low temperature I avoid any objectionable fluxing action due to reaction between the siliceous material of the diatomaceous earth and the lime which is generally present in the filtration residues, on account of the general use of lime in the treatment of sugar solutions. Such fluxing action takes place at a somewhat higher temperature than that at which combined water is driven off from the diatomaceous earth, so that by avoiding a sufficiently high temperature to drive off combined water, I also avoid fluxing action due to the lime and thereby retain the porosity of the filtering agent sufficiently to enable its effective re-use in filtration.

The temperature employed in the calcining operation should be maintained for a proper length of time to burn out the organic material without completely removing from the diatomaceous earth the water chemically combined therewith. In using such temperatures care must be observed not to maintain the temperature for so long a time as might drive off the chemically combined water.

In order to facilitate the operation, the filtration residue may be reduced to fragmentary condition, in any suitable manner before it is heated. Both the drying operation and the heating operation may be conveniently effected in a rotary kiln, or kilns, especially where it is desired to burn out some or all of the organic material.

What I claim is:

1. The process of recovering diatomaceous earth filter aids after use in filtration of liquids containing impurities, which comprises drying such diatomaceous earth filter aids together with impurities removed from the liquid, and then heating the dried residue for a sufficient time to increase the filtration efficiency without removing any substantial amount of chemically combined water from the diatomaceous earth, said residue being reduced to fragmentary condition before the heating operation.

2. The process of recovering diatomaceous earth after use in filtration of liquids containing lime and organic impurities in suspension; which comprises drying the filtration residue containing such diatomaceous earth together with lime and organic impurities removed from the liquid, and then heating the dried residue, said residue being reduced to fragmentary condition before the heating operation; the heating being effected at a low temperature maintained until the organic impurities are driven off and the filtering properties of the diatomaceous earth restored without any substantial amount of chemically combined water being removed from the recovered diatomaceous earth.

3. The process of recovering diatomaceous earth after use in filtration of liquid containing suspended organic impurities, which comprises drying the filtration residue containing such diatomaceous earth together with organic impurities removed from the liquid; heating the dried residue at a low temperature maintained until the organic impurities are driven off and the filtering property of the diatomaceous earth restored without any substantial amount of chemically combined water being removed from the recovered diatomaceous earth, said material being reduced to a fragmentary condition before the heating operation; and finally reducing the product to a state of division suitable for re-use as a filtering agent.

4. The process of recovering diatomaceous earth after same has been used in filtration of liquid containing suspended organic impurities; consisting in drying the filtration residue containing such diatomaceous earth and organic impurities removed from the liquid, reducing such dried residue to fragmentary condition, and then heating the dried residue at a low temperature maintained until the organic impurities are driven off and the filtering properties of the diatomaceous earth restored without any substantial amount of chemically combined water being removed from the recovered diatomaceous earth.

5. The process of recovering diatomaceous earth after use as a filtering agent consisting in drying such used diatomaceous earth, and then heating it at a temperature sufficient to increase the filtration efficiency of such dried diatomaceous earth without removing any substantial amount of chemically combined water from the diatomaceous earth.

6. The process of recovering diatomaceous earth after same has been used in filtration of liquid containing suspended organic impurities, consisting in drying the filtration residue containing such diatomaceous earth together with organic impurities removed from the liquid; reducing such dried residue to a fragmentary condition; heating the reduced dried residue at a temperature maintained until the organic impurities are driven off and the filtering property of the diatomaceous earth restored without driving off any substantial amount of chemically combined water from the diatomaceous earth; and finally reducing such product to a state of division suitable for reuse as a filtering agent.

7. The process of recovering an inorganic filter aid after use in filtration which consists in drying the filter cake containing such filter aid, then disintegrating, and then heating the disintegrated material at a temperature sufficiently high to produce an effective filter aid.

8. The process of recovering diatomaceous earth after use in filtration which consists in drying the filter press cake containing such diatomaceous earth, then disintegrating, and then heating the disintegrated material at a temperature sufficiently high to produce an effective filter aid.

In testimony whereof I have hereunto subscribed my name this 10th day of January, 1921.

PERCY A. BOECK.